United States Patent
Barcklay et al.

(10) Patent No.: US 9,367,566 B2
(45) Date of Patent: *Jun. 14, 2016

(54) TILED MAP DISPLAY ON A WIRELESS DEVICE

(71) Applicant: TeleCommunication Systems, Inc., Annapolis, MD (US)

(72) Inventors: Bob Barcklay, Berkely, CA (US); Ritesh Bansal, Fremont, CA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,050

(22) Filed: Apr. 20, 2015

(65) Prior Publication Data

US 2015/0227555 A1  Aug. 13, 2015

Related U.S. Application Data

(63) Continuation of application No. 11/251,766, filed on Oct. 18, 2005, now Pat. No. 9,041,744.

(60) Provisional application No. 60/698,922, filed on Jul. 14, 2005.

(51) Int. Cl.
   *G06F 17/30* (2006.01)

(52) U.S. Cl.
   CPC .... *G06F 17/30244* (2013.01); *G06F 17/30902* (2013.01)

(58) Field of Classification Search
   CPC ...................... G09G 2360/122; G09G 2310/04
   See application file for complete search history.

(56) References Cited

U.S. PATENT DOCUMENTS

| 5,359,529 A | 10/1994 | Snider |
| 6,021,406 A | 2/2000 | Kuznetsov |

(Continued)

FOREIGN PATENT DOCUMENTS

| CA | WO2006/125291 | 5/2005 |
| GB | 2402778 | 10/2004 |

(Continued)

OTHER PUBLICATIONS

PCT International Search Report (PCTUS2008/10542)and Written Opinion of International Searching Authority, Nov. 26, 2008.

(Continued)

*Primary Examiner* — Jeffrey Chow
(74) *Attorney, Agent, or Firm* — Tarolli, Sundheim, Covell & Tummino LLP

(57) ABSTRACT

A tiled-map display control with a predictive caching technique that minimizes user wait time and provides at least the illusion of continuous panning, even while map tile images are being loaded. Important components of the tiled map display are its definition and cached use of map tiles, as well as the way that the map tiles are put together on a small screen. Easy, seamless, wait-free and convenient viewing of a map for a user of a wireless device provides information, e.g., mapped traffic conditions. The disclosed embodiments are techniques that have been reduced to practice in both a BREW platform, and then in a J2ME platform, and deployed for operation in major carrier wireless networks. The invention has particular applicability for use in wireless devices with typically smaller display screens requiring the need for panning, and limited bandwidth capabilities of the supporting wireless network.

18 Claims, 7 Drawing Sheets

(56) References Cited

U.S. PATENT DOCUMENTS

| | | |
|---|---|---|
| 6,026,398 A | 2/2000 | Brown |
| 6,064,941 A | 5/2000 | Nimura |
| 6,108,650 A | 8/2000 | Musk |
| 6,119,013 A | 9/2000 | Maloney |
| 6,377,945 B1 | 4/2002 | Risvik |
| 6,424,912 B1 | 7/2002 | Correia |
| 6,487,495 B1 | 11/2002 | Gale |
| 6,507,785 B1 | 1/2003 | Stefan |
| 6,523,021 B1 | 2/2003 | Monberg |
| 6,529,143 B2 | 3/2003 | Mikkola |
| 6,587,782 B1 | 7/2003 | Nocek |
| 6,636,803 B1 | 10/2003 | Hartz |
| 6,671,424 B1 | 12/2003 | Skoll |
| 6,940,407 B2 | 9/2005 | Miranda-Knapp |
| 7,162,470 B2 | 1/2007 | Sharma |
| 7,373,246 B2 | 5/2008 | O'Clair |
| 7,444,326 B1 | 10/2008 | Jagadish |
| 7,499,914 B2 | 3/2009 | Diab |
| 7,548,915 B2 | 6/2009 | Ramer |
| 7,747,611 B1 | 6/2010 | Milic-Frayling |
| 7,840,579 B2 | 11/2010 | Samuelson |
| 7,917,154 B2 | 3/2011 | Fortescue |
| 7,949,642 B2 | 5/2011 | Yang |
| RE42,927 E | 11/2011 | Want |
| 8,095,434 B1 | 1/2012 | Puttick |
| 8,265,864 B1 | 9/2012 | Kaufman |
| 2001/0021894 A1 | 9/2001 | Sakamoto |
| 2001/0047241 A1 | 11/2001 | Khavakh |
| 2002/0021231 A1 | 2/2002 | Schlager |
| 2002/0083062 A1 | 6/2002 | Neal |
| 2002/0098851 A1 | 7/2002 | Walczak |
| 2002/0130953 A1 | 9/2002 | Riconda |
| 2002/0190861 A1 | 12/2002 | Wentworth |
| 2002/0198694 A1 | 12/2002 | Yang |
| 2003/0055555 A1 | 3/2003 | Knockeart et al. |
| 2003/0071728 A1 | 4/2003 | McDonald |
| 2004/0030493 A1 | 2/2004 | Pechatnikov et al. |
| 2004/0135784 A1 | 7/2004 | Cohen |
| 2004/0158829 A1 | 8/2004 | Beresin |
| 2004/0185870 A1 | 9/2004 | Matsuda |
| 2004/0217980 A1 | 11/2004 | Radburn |
| 2004/0220918 A1 | 11/2004 | Scriffignano |
| 2005/0149253 A1 | 7/2005 | Nambata |
| 2005/0228780 A1 | 10/2005 | Diab |
| 2005/0288033 A1 | 12/2005 | McNew |
| 2006/0023626 A1 | 2/2006 | Krausz |
| 2006/0068753 A1 | 3/2006 | Karpen |
| 2006/0089792 A1 | 4/2006 | Manber et al. |
| 2006/0105782 A1 | 5/2006 | Brock |
| 2006/0135178 A1 | 6/2006 | Allyn |
| 2006/0229802 A1 | 10/2006 | Vertelney et al. |
| 2006/0246922 A1 | 11/2006 | Gasbarro |
| 2007/0041513 A1 | 2/2007 | Gende |
| 2007/0072620 A1 | 3/2007 | Levitan |
| 2007/0078848 A1 | 4/2007 | Sareen |
| 2007/0083557 A1 | 4/2007 | Leiserowitz |
| 2007/0094042 A1 | 4/2007 | Ramer |
| 2007/0118520 A1 | 5/2007 | Bliss |
| 2007/0124216 A1 | 5/2007 | Lucas |
| 2007/0149243 A1 | 6/2007 | Hwang |
| 2007/0156334 A1 | 7/2007 | Vu |
| 2007/0174259 A1 | 7/2007 | Amjadi |
| 2007/0233817 A1 | 10/2007 | Johnson et al. |
| 2007/0239752 A1 | 10/2007 | Beitman |
| 2007/0281690 A1 | 12/2007 | Altman |
| 2007/0298812 A1 | 12/2007 | Singh |
| 2008/0004043 A1 | 1/2008 | Wilson |
| 2008/0104059 A1 | 5/2008 | Segel |
| 2008/0104227 A1 | 5/2008 | Birnie |
| 2008/0120293 A1 | 5/2008 | Morisawa |
| 2008/0154856 A1 | 6/2008 | Riise |
| 2008/0154888 A1 | 6/2008 | Buron |
| 2008/0218407 A1 | 9/2008 | Norda |
| 2008/0249983 A1 | 10/2008 | Meisels |
| 2008/0319652 A1 | 12/2008 | Moshfeghi |
| 2008/0319653 A1 | 12/2008 | Moshfeghi |
| 2008/0319990 A1 | 12/2008 | Taranenko |
| 2009/0009397 A1 | 1/2009 | Taylor |
| 2009/0018840 A1 | 1/2009 | Lutz |
| 2009/0100037 A1 | 4/2009 | Scheibe |
| 2009/0132514 A1 | 5/2009 | Kisluk |
| 2009/0144260 A1 | 6/2009 | Bennett |
| 2009/0150349 A1 | 6/2009 | Cartin |
| 2009/0171934 A1 | 7/2009 | Ratnakar |
| 2009/0171955 A1 | 7/2009 | Merz |
| 2009/0210413 A1 | 8/2009 | Hayashi |
| 2009/0222438 A1 | 9/2009 | Strandell |
| 2009/0248663 A1 | 10/2009 | Maniyar |
| 2009/0325615 A1 | 12/2009 | McKay et al. |
| 2010/0037057 A1 | 2/2010 | Shim et al. |
| 2011/0003578 A1 | 1/2011 | Chen et al. |

FOREIGN PATENT DOCUMENTS

| | | |
|---|---|---|
| JP | 2008 039698 | 2/2008 |
| WO | WO2006/071271 | 7/2006 |

OTHER PUBLICATIONS

PCT International Search Report (PCTUS2007/11027) and Written Opinion of International Searching Authority, Feb. 21, 2008.

International Search Report in PCT/US2009/05486 dated Jan. 21, 2010.

Ahern et al., "World Explorer: Visualizing Aggregate Data from Unstructured Text in Geo-Referened Collections," Jun. 18-23, 2007, ACM, JCDL'07.

Internal Search Report received in PCT/US2008/12621 dated Jan. 8, 2009.

PCT International Search Report (PCTUS2004/0217980) and Written Opinion of International Searching Authority, May 28, 2008.

European Search Report received in European Appl. No. 09819546.4 dated Oct. 15, 2012.

John Krumm et al, "Map Matching with Travel Time Constraints", SAE 2007 World Congress, Apr. 19, 2007.

PCT International Search Report (PCTUS2006/027096) and Written Opinion of International Searching Authority, Aug. 21, 2008.

FIG. 2A

| TILE # 7 125 | TILE # 3 123 | TILE # 6 120 |
|---|---|---|
| TILE # 4 126 | TILE # 1 DISPLAYED 150 | TILE # 2 121 |
| TILE # 8 127 | TILE # 5 124 | TILE # 9 122 |

*FIG. 2B*

| TILE # 6 125 | TILE # 2 123 | TILE # 7 120 |
|---|---|---|
| TILE # 5 126 | TILE # 1 DISPLAYED 150 | TILE # 3 121 |
| TILE # 9 127 | TILE # 4 124 | TILE # 8 122 |

PANNING

PANNING

PANNING

TILED MAP DISPLAY ON A WIRELESS DEVICE

The present invention is a continuation of U.S. application Ser. No. 11/251,766, filed on Oct. 18, 2005, entitled "Tiled Map Display on a Wireless Device"; which claims priority from U.S. Provisional Application 60/698,922, filed Jul. 14, 2005, entitled "Tiled Map Display on a Wireless Device", to Barckaly et al., the entirety of both of which are expressly incorporated herein by reference.

BACKGROUND OF THE INVENTION

1. Field of the Invention

This invention relates generally to wireless telecommunication. More particularly, it relates to display techniques in wireless applications that enable viewing by a user of a wireless device.

2. Background of the Related Art

Year by year, wireless devices such as cell phones have grown smaller and lighter. Along with this trend of miniaturization is the implementation of a display screen that is correspondingly small. The size of the display screen, and amount of memory within the wireless device, are often limiting factors in many applications. This is particularly true for applications running in a wireless device that attempt to display a map for a user.

When a map is displayed in a wireless device using a conventional application, typically a map somewhat larger than the size of the display screen is downloaded and displayed centered on the display. However, existing map display applications are a bit cumbersome to use on a wireless device, as they typically do not allow the user to fluidly pan around a map that is being displayed at the time.

For instance, FIG. 6 shows a conventional wireless device (e.g., a cell phone) 600 having an LED display 610 and an image 660 loaded for display thereon. Existing applications load a display image 660 that is at best just a little larger in memory than the displayable portion of the display image 650.

In such conventional applications, the loaded image 660 is centered on the display 610, with undisplayed, or cropped portions of the loaded image forming an overlapping border image area, e.g., a 30 to 50 pixel border area just outside the displayable portion of the image 650.

In many displaying applications, particularly those that display a map, it is desirable to allow panning by the user. Most often, direction or arrow keys on a keypad of the wireless device are operated to cause the relevant application to move the displayed image in a desired direction. When panning, the user can move the displayed image only up until the point at which the edge of the loaded image meets the relevant edge of the display 610. At this point, the panning operation pauses, and a new image is requested by the wireless device—all while the user waits for the download of a new image centered at the current point of the curser.

Conventional panning operations on wireless devices provide a pop up such as a progress bar that visually depicts the state of the downloading operation for the new image centered at the current location. At this point, until the new image is fully downloaded, conventional applications disallow most user operations while the new image is being downloaded to maximize efforts (and reduce time) in fetching the new image, which severely interrupts the user's experience of panning through the displayed image.

When the wireless device is finally ready to continue (which in a wireless society seconds can seem like forever), the previously loaded image is deleted from memory, and replaced with a new image centered at the current point of the cursor. No attempt is made to reuse the old, deleted image.

Thus, most existing applications load a single map image, somewhat larger in dimensions than the screen, and allow the user to pan to one of the edges. Up until this point the panning operation may be smooth, but when the user reaches the edge of the map the application will appear to freeze. Many times a pop-up with a progress bar and/or an hourglass is usually displayed indicating to the user that the wireless device is working, and the user waits for the next map image to be retrieved across the wireless network. The inventors of this application appreciated that this conventional approach results in a poor user experience with significant wait periods each time a loaded map edge is reached, and a new map display image requested to be viewed is loaded. If the map images are not cached, the user often has to wait again for display of the same map if they pan back to a location that they have already viewed.

There is a need for both more seamless panning as perceived by the user of a wireless device such as a cell phone, as well as to minimize the down time during Which the user is not permitted to continue on with their mapping control while the image is being fetched.

SUMMARY OF THE INVENTION

In accordance with the principles of the present invention, a display module in a wireless device comprises an image tile loader module. An image tile cache memory (i.e., "cache manager") is adapted to contain a plurality of image tiles. At least one of the plurality of image tiles is not in a viewable section of an overall image when downloaded to the wireless device. A predictive selection module running a suitable tile selection process causes the image tile loader module (i.e., "data manager") to fetch a next image tile before the next image tile is required for display on the wireless device.

In accordance with another aspect of the invention, a method of fetching a pan-able image for display on a wireless device comprises defining the pan-able image into a plurality of image tiles. A direction of panning is determined by a user viewing a displayed portion of the pan-able image on the wireless device. A next one of the plurality of image tiles is fetched based on the determined direction of panning.

BRIEF DESCRIPTION OF THE DRAWINGS

FIG. 2A shows a loaded image comprised of 3×3, or nine total, tile images, loaded in a predictive order, in accordance with the principles of the present invention.

FIG. 2B shows a loaded image comprised of 3×3, or nine total, tile images, loaded in a different predictive order than as shown in FIG. 2A, in accordance with the principles of the present invention.

DETAILED DESCRIPTION OF ILLUSTRATIVE EMBODIMENTS

The present invention provides a tiled-map display control with a predictive caching technique that minimizes user wait time and allows for the illusion of continuous panning, even while map the images are being loaded. Important components of the tiled map display are its definition and cached use of map tiles, as well as the way that the map tiles are put together on a small screen.

The present invention enables easy, seamless, wait-free and convenient viewing of a map or other pan-able image by a user of a wireless device. An image implemented in the embodiments herein is a map showing traffic conditions, though the invention has applicability to maps in general.

The disclosed embodiments are techniques that may be implemented in a suitable software platform, e.g., BREW or J2ME, and deployed for operation in major carrier wireless networks. The present invention has particular applicability for use in wireless devices because of the typically smaller display screens requiring the need for panning, and also because of the smaller bandwidth capabilities of the supporting wireless network.

Figure 1:
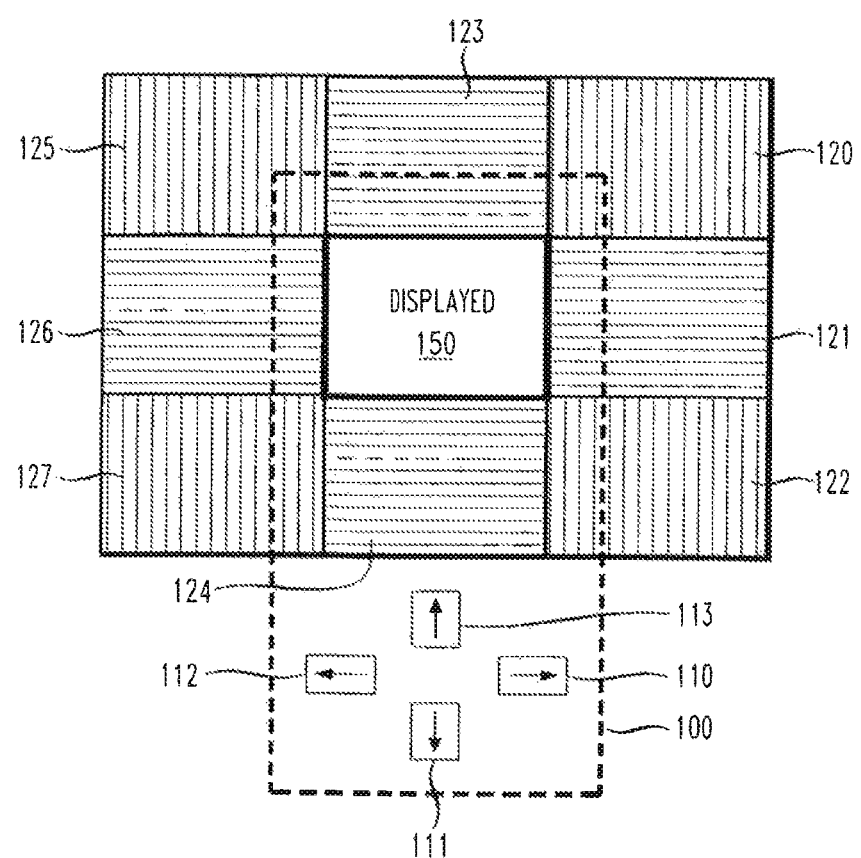
FIG. 1 shows an image loaded in blocks, or tiles, providing a 3×3 matrix of tiles about an image currently being displayed, in accordance with the principles of the present invention.

FIG. 1 shows an image loaded in blocks, or tiles, providing a 3×3 matrix of tiles about an image currently being displayed, in accordance with the principles of the present invention.

In particular, as shown in FIG. 1, a plurality of tiles 120-127, 150 are loaded into memory of a wireless device such as a cell phone. Upon initial startup of the relevant application, the central tile 150 is loaded first and displayed. The goal of the application map control (i.e., "display module") is to load and cache all surrounding tiles 120-127 for ready-display to provide a seamless panning experience for the user.

Presuming the user is not yet panning on the wireless device, the displayed tile 150 is preferably downloaded or fetched first, followed by tiles 120-127 in a predetermined order.

When the user first brings up an image tile on the device, the application fetches the first image tile (Tile #1) 150 with dimensions that correspond exactly to the screen dimensions of the device. Upon loading the first tile 150 and storing it in a cache on the wireless device, the technique immediately begins fetching the surrounding image tiles 120-127 in anticipation of user requests to pan around on the image (e.g., map). The user may pan (go 25, left, right, up, down) at anytime. If the image tile hasn't yet been loaded, the user sees the outline of the image tile and a % loaded indicator. The order in which image tiles are requested over the network is a predictive technique based on the current direction of pan and the currently displayed image tile. The sequence of image tiles to be fetched is re-evaluated after a single image tile has been loaded and stored in the cache. The display component of the application combine's these image tiles into what looks like a continuously pan-able image with no edges.

FIG. 2A shows a loaded image comprised of 3×3, or nine total, tile images, loaded in a predictive order, in accordance with the principles of the present invention.

In particular, as shown in FIG. 2A, a displayed tile 150 is fetched and cached first, followed by tiles 121, 123, 126, 124 adjacent the edges of the displayed tile 150. If at that point the user still hasn't yet panned in any direction, the remaining tiles 120, 125, 127, 122 off the corners of the displayed tile 150 are then fetched and cached in persistent storage on the device such as image tile cache memory (i.e., "cache manager").

The ordering of tiles fetched when the application first starts up may be other than that shown in FIG. 2A. For instance, FIG. 2B shows a loaded image comprised of 3×3, or nine total, tile images, loaded in a different predictive order than as shown in FIG. 2A, in accordance with the principles of the present invention. In FIG. 2B, the displayed tile 150 is fetched first, followed in order by tiles 123, 121, 124, 126, 125, 120, 122 and 127.

Most wireless devices provide a user interface allowing the user to provide directional control. For instance, in the given application on a cell phone, arrow keys 110-113 provide keyed input of direction instructions in the right, down, left and right directions, respectively.

Importantly, in accordance with the principles of the present invention, predictive prioritization of tile fetching is provided as a result of the user panning in any given direction. Unfetched tiles adjacent to the displayed portion of the tiles in that particular direction are prioritized and fetched before other tiles in directions not being panned to at the time.

Preferably, the closer an unfetched tile is to having any portion required for display, the higher a priority it is given in a fetching order. Moreover, should memory requirements limit the number of tiles capable of being stored, tiles are preferably retained longer in a direction of a current or last panning operation, with tiles farthest away in a direction opposite the direction of panning being first to be deleted or overwritten.

Thus, as the user pans the map, using arrows keys 110-113 on the device, new tiles become visible. The preferred technique for fetching tiles is adaptive in the sense that upon the completion of fetching one tile, the technique determines the currently displayed map tile(s). If this has changed, the fetching technique will re-prioritize the list of tiles to be fetched.

Figure 3:
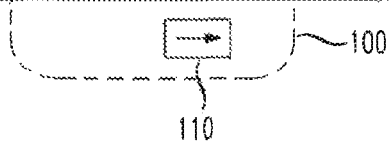
FIG. 3 shows a predictive loading of additional tiles as the displayed image is panned to the RIGHT under control of a user operating a keypad of a wireless device, in accordance with the principles of the present invention.

FIG. 3 shows a predictive loading of additional tiles as the displayed image is panned to the RIGHT under control of a user operating a keypad of a wireless device, in accordance with the principles of the present invention.

In particular, as shown in FIG. 3, the user is panning to the right using right arrow keypad key 110. In the given example, the wireless device user starts out viewing tile #1 150, and pans right to view tile #2 121. Tile #2 121 will become the new Tile #1 and the list of tiles to be fetched are reprioritized based on the direction of panning to the right.

Tiles already fetched preferably remain in the cache until they either expire based on a time to live setting, or must be removed to make room for a tile that is closer to the user's currently displayed location in the latest direction of pan.

Hysteresis may be implemented wherein small pans in different directions may not influence the predictive nature of the tile fetching priority as much as large movements. For instance, a threshold distance may be established beyond which the priorities of tile fetching becomes reprioritized.

Figure 4:
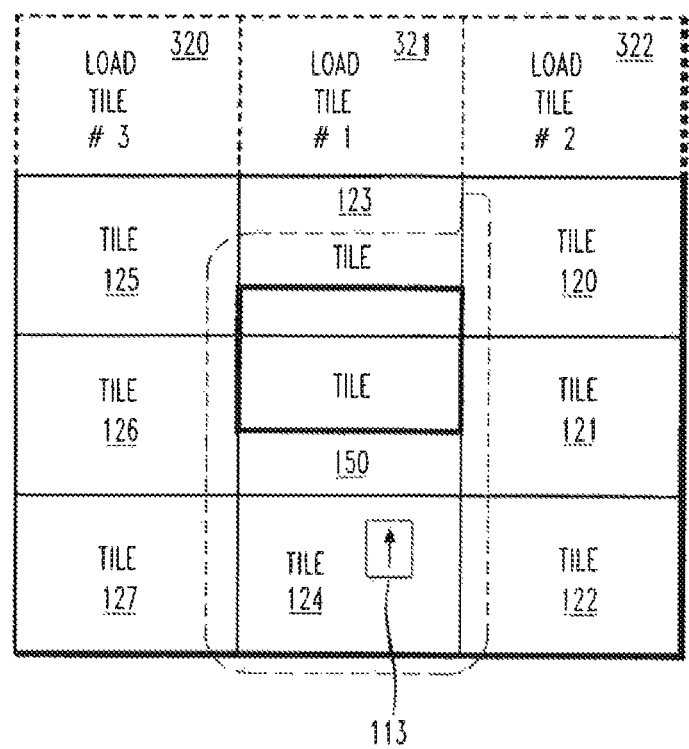
FIG. 4 shows a predictive loading of additional tiles as the displayed image is panned UP under control of a user operating a keypad of a wireless device, in accordance with the principles of the present invention.

FIG. 4 shows a predictive loading of additional tiles as the displayed image is panned UP under control of a user operating a keypad of a wireless device, in accordance with the principles of the present invention.

In particular, as shown in FIG. 4, the user is panning UP using UP arrow keypad key 113. In the given example, the wireless device user starts out viewing tile #1 150, and pans UP to view tile 123. Tile 123 then becomes the new Tile #1 and the list of tiles to be fetched are reprioritized based on the direction of panning in the UP direction.

Figure 5:
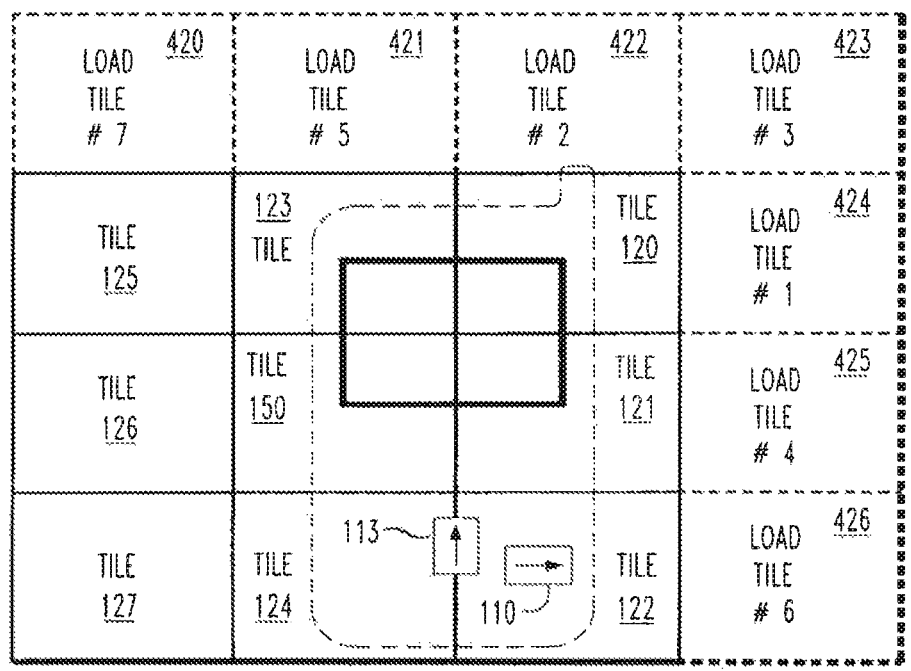
FIG. 5 shows a predictive loading of additional tiles as the displayed image is panned UP and to the RIGHT under control of a user operating a keypad of a wireless device, in accordance with the principles of the present invention.
Figure 6:
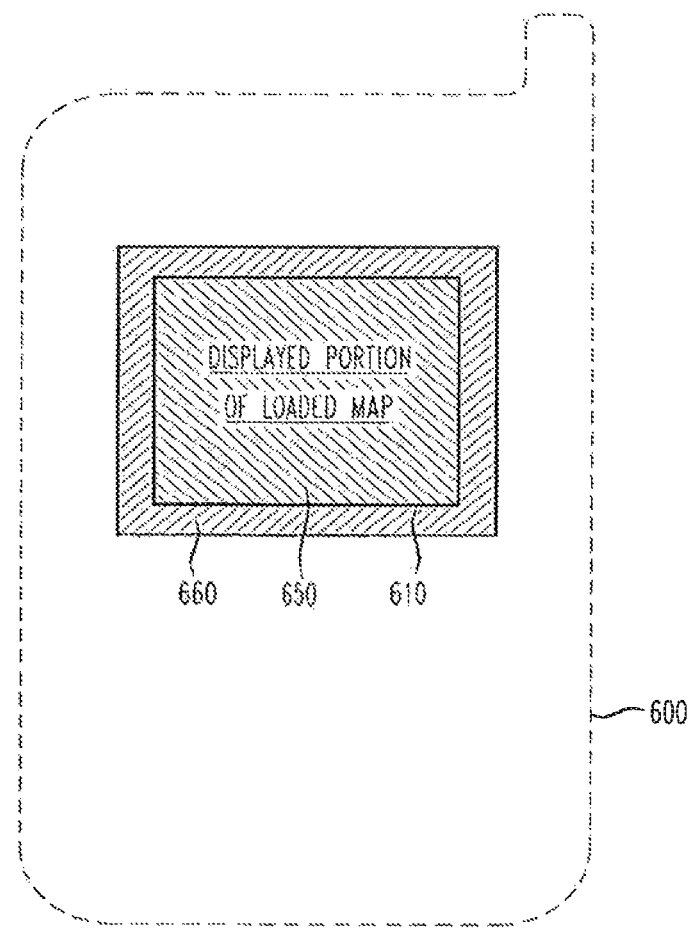
FIG. 6 shows a conventional wireless device (a cell phone) having an LED display and an image loaded for display thereon.

For the sake of exhaustiveness, FIG. 5 shows a predictive loading of additional tiles as the displayed image is panned UP and to the RIGHT under control of a user operating a keypad of a wireless device, in accordance with the principles of the present invention.

In particular, as shown in FIG. 5, the user is panning UP and to the RIGHT using keypad keys 110, 113 (or a single keypad key if an 8-direction keypad is provided). In the given example, the wireless device user starts out viewing tile #1 150, and pans UP and to the RIGHT to view tiles 121, 120 and 123. At the point at which tile 120 becomes the tile with the largest amount of DISPLAYED area, tile 121 becomes the new Tile #1, and the list of tiles to be fetched will be reprioritized based on the direction of panning UP and to the RIGHT.

Preferably, as the user changes direction of panning, the priority given to the tile order being fetched may be dynamically updated.

In further embodiments, tiles are split into sub-tiles to support wireless devices with less available memory. For instance, the tiles 150, 120-127 shown in FIGS. 1-5 may be each broken into 2×2 images. In such a scenario, a single tile fetch returns four (4) sub-tiles. The reason for this is to limit the amount of display memory that is required. The use of the four sub-tiles minimizes use of display memory and/or random access memory (RAM) on the wireless device. In the disclosed embodiments, this is separate from the persistent storage where map tiles are cached by the image tile loader (i.e., "data manager").

For example, if the user pans so that the corner of a tile is in the center of the display screen, we would initially have to render 4 large tiles in memory even though only a quarter of each tile is actually visible on screen. With the sub-tile enhancement, we are able to render in memory just what is visible, reducing the memory footprint of the application, allowing operation on a wider variety of wireless devices.

Thus, according to the invention, tiled images such as maps are adaptively and predictively fetched, and stitched together on a wireless device such as a cell phone, to create the illusion of an infinitely large image which is seamless to the user. The invention pre-fetches image tiles before they are required for display so that the user can pan around past image tiles fetched initially. When the user finally stops panning, any image tiles not yet fetched are prioritized and quickly fetched and displayed. Accordingly, the user can pan over the edge of the image tile, and that missing image tile is shown as a blank area.

Ideally a progress bar or percentage is shown for each image tile being fetched. In disclosed embodiments, a 'throbber' is shown for each image tile or cell on the image grid that's not yet displayed. The 'throbber' is a pulsing ball with a percentage complete next to it. In certain instances, there could be as many as 4 'throbbers' representing 4 different image tiles displayed simultaneously.

Thus, some image tiles will be fetched before others, and the progress will complete quicker for those image tiles than for others. Eventually, any missing or blank areas of the image are filled in.

As technology progresses and bandwidth improves for wireless devices such as cell phones, the image tiles will show up as fast as the user can pan.

In the disclosed embodiments, the complete high resolution image tiles are displayed when fully loaded—the low resolution image isn't shown first as it becomes available as it is not deemed worth expending processing time in displaying the low resolution temporary image. However, temporary use of a low resolution image of an image tile being downloaded is within the scope of the invention.

In disclosed embodiments, a 3×3 image tile grid is maintained in cache memory, centered about the image tile most predominant in the display at the time. As the user pans, if it is a quick pan and bandwidth to the wireless device is slow, in a worst case the user may have for display only one of the 3×3 image tile grid, but when the panning operation stops the processor can catch up and fill in the 3×3 in a prioritized order.

A benefit of the invention is that, on average, image tiles load more quickly by taking advantage of the cache. Since the user is never forced to wait for something to happen, the user experience is much smoother and generally better.

The invention has particular application with wireless application developers that want to display large detailed images on a small display, e.g., the display of maps on a wireless device such as a cell phone or PDA. The invention also has applicability with vendors offer mapping functionality for portable, wireless devices in particular.

While the invention has been described with reference to the exemplary embodiments thereof, those skilled in the art will be able to make various modifications to the described embodiments of the invention without departing from the true spirit and scope of the invention.

What is claimed is:

1. A method of providing display files to a physical wireless device from a physical wireless network, comprising:
    transmitting, from a physical wireless carrier network for display on a given physical wireless device, a first image tile in a displayable size corresponding exactly to dimensions of said display on said given physical wireless device;
    displaying said first image tile on said display of said given physical wireless device;
    transmitting, for display a predicted second image tile, said predicted second image tile being based on said first image tile currently displayed on said given physical wireless device, and on a predetermined minimum threshold distance of cursor movement on said display on said given physical wireless device in a direction associated with being toward said second image tile; and
    generating, from said predicted second image tile, a plurality of sub-tiles comprising said second image tile, each of said plurality of sub-tiles having a displayable fractional size as compared to said displayable size of said first image tile;
    wherein fewer than all of said plurality of sub-tiles are maintained in display memory of said given physical wireless device for future display operation by said given physical wireless device.

2. The method of providing display files to a physical wireless device from a physical wireless network according to claim 1, wherein:
    said given wireless device is a cell phone.

3. The method of providing display files to a physical wireless device from a physical wireless network according to claim 1, wherein:
    said wireless device is a personal digital assistant (PDA).

4. The method of providing display files to a physical wireless device from a physical wireless network according to claim 1, further comprising:
    dynamically subsequently predictively fetching a predicted third image tile, a choice of said third image tile being based on a predetermined minimum threshold distance of cursor movement in a direction of display toward said third image tile.

5. The method of providing display files to a physical wireless device from a physical wireless network according to claim 4, wherein:
said predicted third image tile comprises a plurality of sub-tiles; and
fewer than all of said plurality of sub-tiles are placed in display memory of said given wireless device.

6. The method of providing display files to a physical wireless device from a physical wireless network according to claim 1, wherein:
said fractional size is ¼ a size of said fetched second image tile.

7. The method of providing display files to a physical wireless device from a physical wireless network according to claim 1, further comprising:
re-selecting a sequence of image tiles to be fetched after a single image tile has been loaded and stored in a display cache.

8. The method of providing display files to a physical wireless device from a physical wireless network according to claim 1, wherein:
an ordering of predictively fetching image tiles is prioritized by the closer an unfetched image tile is to having any portion thereof required for display.

9. The method of providing display files to a physical wireless device from a physical wireless network according to claim 1, wherein:
image tiles are retained longer in a display cache in a direction of a last panning operation, with image tiles farthest away in a direction opposite said last panning being first to be deleted or overwritten in said display cache.

10. A method of providing display files to a physical wireless device from a physical wireless network, comprising:
fetching, at a physical wireless carrier network for display on a given physical wireless device, a first image tile in a displayable size corresponding exactly to dimensions of said display on said given physical wireless device;
routing, from said physical wireless carrier network to said given physical wireless device, said first image tile for display on said display of said given physical wireless device;
fetching, at a physical wireless carrier network for display, a predicted second image tile, said predicted second image tile being based on said first image tile currently displayed on said given physical wireless device, and on a predetermined minimum threshold distance of cursor movement on said display on said given physical wireless device in a direction associated with being toward said second image tile; and
generating, from said predicted second image tile, a plurality of sub-tiles comprising said second image tile, each of said plurality of sub-tiles having a displayable fractional size as compared to said displayable size of said first image tile; and
routing, from said physical wireless carrier network, fewer than all of said plurality of sub-tiles to said given physical wireless device.

11. The method of providing display files to a physical wireless device from a physical wireless network according to claim 10, wherein:
said given wireless device is a cell phone.

12. The method of providing display files to a physical wireless device from a physical wireless network according to claim 10, wherein:
said wireless device is a personal digital assistant (PDA).

13. The method of providing display files to a physical wireless device from a physical wireless network according to claim 10, further comprising:
dynamically subsequently predictively fetching a predicted third image tile, a choice of said third image tile being based on a predetermined minimum threshold distance of cursor movement in a direction of display toward said third image tile.

14. The method of providing display files to a physical wireless device from a physical wireless network according to claim 13, wherein:
said predicted third image tile comprises a plurality of sub-tiles; and
fewer than all of said plurality of sub-tiles are placed in display memory of said given wireless device.

15. The method of providing display files to a physical wireless device from a physical wireless network according to claim 10, wherein:
said fractional size is ¼ a size of said fetched second image tile.

16. The method of providing display files to a physical wireless device from a physical wireless network according to claim 10, further comprising:
re-selecting a sequence of image tiles to be fetched after a single image tile has been loaded and stored in a display cache.

17. The method of providing display files to a physical wireless device from a physical wireless network according to claim 10, wherein:
an ordering of predictively fetching image tiles is prioritized by the closer an unfetched image tile is to having any portion thereof required for display.

18. The method of providing display files to a physical wireless device from a physical wireless network according to claim 10, wherein:
image tiles are retained longer in a display cache in a direction of a last panning operation, with image tiles farthest away in a direction opposite said last panning being first to be deleted or overwritten in said display cache.

* * * * *